(12) United States Patent
Fan et al.

(10) Patent No.: US 9,378,520 B2
(45) Date of Patent: Jun. 28, 2016

(54) METHOD, MEDIUM, AND SYSTEM FOR OBTAINING RATINGS USING A RATING SERVICE

(71) Applicant: AT&T Intellectual Property I, L.P., Atlanta, GA (US)

(72) Inventors: James W. Fan, San Ramon, CA (US); Jeffrey A. Aaron, Atlanta, GA (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 710 days.

(21) Appl. No.: 13/705,442

(22) Filed: Dec. 5, 2012

(65) Prior Publication Data

US 2014/0156460 A1    Jun. 5, 2014

(51) Int. Cl.
*G06Q 30/00* (2012.01)
*G06Q 30/06* (2012.01)

(52) U.S. Cl.
CPC ................... *G06Q 30/0623* (2013.01)

(58) Field of Classification Search
CPC .......... G06Q 30/0631; G06Q 30/0639; G06Q 30/0267; G06Q 30/0641; G06Q 30/0203; G06Q 30/0205
USPC .............................. 705/26.1, 27.1, 7.32, 7.34
See application file for complete search history.

(56) References Cited

U.S. PATENT DOCUMENTS

| | | | |
|---|---|---|---|
| 5,559,707 A * | 9/1996 | DeLorme | G01C 21/20 340/990 |
| 8,275,394 B2 | 9/2012 | Mattila et al. | |
| 2008/0215290 A1 | 9/2008 | Zweben et al. | |
| 2009/0027223 A1 * | 1/2009 | Hill | G06Q 30/02 340/686.6 |
| 2010/0026526 A1 * | 2/2010 | Yokota | G08G 1/096827 340/996 |
| 2010/0161718 A1 | 6/2010 | Soelberg et al. | |
| 2010/0291950 A1 * | 11/2010 | Lin | H04W 4/02 455/456.3 |
| 2010/0295676 A1 * | 11/2010 | Khachaturov | G08B 21/24 340/540 |
| 2012/0214515 A1 * | 8/2012 | Davis et al. | 455/456.3 |
| 2012/0330722 A1 * | 12/2012 | Volpe | G06Q 30/0201 705/7.32 |
| 2013/0031169 A1 * | 1/2013 | Axelrod | H04L 67/306 709/204 |
| 2014/0114716 A1 * | 4/2014 | Flogel | G06Q 10/1095 705/7.19 |

OTHER PUBLICATIONS

Ghose, Anindya, and Panagiotis G. Ipeirotis. "Estimating the helpfulness and economic impact of product reviews: Mining text and reviewer characteristics." Knowledge and Data Engineering, IEEE Transactions on 23.10 (2011): 1498-1512.*

Parker, J., "Checkmark Offers Slick Location-Based Reminders," <http://reviews.cnet.com/8301-19512_7-57475333-233/checkmark-offers-slick-location-based-reminders>, Jul. 18, 2012.

(Continued)

*Primary Examiner* — Matthew Zimmerman
(74) *Attorney, Agent, or Firm* — Hartman & Citrin LLC

(57) ABSTRACT

Concepts and technologies are disclosed herein for obtaining ratings using a rating service. A server computer executing a rating service can detect arrival of a user device at a vendor location. The server computer also can detect an interaction with a product offered at the vendor location by the user device. The server computer can determine that a rating for the product is to be requested, and can request the rating from the user device.

20 Claims, 10 Drawing Sheets

(56) References Cited

OTHER PUBLICATIONS

Johnson, Theo, "Gloogle Plus and Maps Go Local," <http://geekbeat.tv/google-plus-and-maps-go-local/>, May 31, 2012.

Hattersley, Rosemary, "Telmaps Offers Location-Based Reviews and In-Map Apps," <http://www.pcadvisor.co.uk/news/mobile-phone/3261178/telmaps-offers-location-based-reviews-and-in-map-apps/>, Feb. 15, 2011.

\* cited by examiner

METHOD, MEDIUM, AND SYSTEM FOR OBTAINING RATINGS USING A RATING SERVICE

BACKGROUND

This application relates generally to obtaining ratings. More specifically, the disclosure provided herein relates to obtaining ratings using a rating service.

Over the past few years, the prevalence of portable communication and/or computing devices has skyrocketed. For example, some consumers now carry smartphones and other portable Internet-enabled devices that may allow consumers to access the Internet from almost any location. More recently, users have begun using portable Internet-enabled devices to complete tasks that previously may have been completed with a desktop computer.

Along with enhanced computing power of portable computing devices, some communications providers have updated their communications networks to support frequent data communications with the portable computing devices. As a result, some communications network operations may know a geographic location of a computing device at almost any time and can leverage that information to provide new services for users and/or to otherwise enhance the user experience.

For example, weather information may be provided to a smartphone based upon a location of the smartphone. Similarly, some mapping programs may provide traffic information associated with an area at or near a device executing the mapping programs. Thus, location based services can be used to tailor information presented at and/or provided by a portable computing device.

SUMMARY

The present disclosure is directed to obtaining ratings using a rating service. A server computer can execute a ratings service that can be used to request ratings from user devices. As used herein, a "rating" can refer to any type or sort of information or indication that explicitly or implicitly relates to rater's opinion of the value, goodness, usefulness, worth, or other characteristic of an applicable product, service, vendor location, company, or the like. The ratings can be defined in various manners including, but not limited to, numbers of stars, numbers of bars, numerical ratings, alphabet ratings (e.g., A-F, etc.), absolute or relative ratings, analogous ratings (e.g., gold, silver, bronze, dirt, etc.), specific or general comments, combinations thereof, or the like. Ratings can be direct or implied. Ratings also can relate to any one or more aspects or dimensions of a product, service, or the like. The ratings also may have multiple aspects or dimensions. The ratings may be emotional and/or logical, highly subjective or somewhat objective, done from a personal perspective or a professional perspective (e.g., different roles or personas of the rater).

The ratings requested by the server computer can be requested based upon a location of the user device and information indicating that the user device is interacting with a particular product or service. As used herein, an "interaction" can include searching the Web for prices, information, and/or reviews associated with the product or service; adding the product or service to a wish list or shopping cart; scanning a bar code, QR-code, or other visual indicia associated with the product or service; web site access; combinations thereof; or the like. The requests also can be based upon information provided by a vendor such as, for example, an indication as to if a rating for the product or service is requested.

The ratings can be requested from the user device. Embodiments of the concepts and technologies disclosed herein also can support delaying completion of ratings. Thus, for example, a user can indicate that a rating is to be delayed until a later time, until a location is arrived at or departed from by the user device, and/or until a user later requests completion of the review. The rating service also can track movement of the user device and present, upon request, a visual display of a travel history associated with, for example, a shopping trip. The visual display can include an indication of stops on the shopping trip, as well as a number of ratings (if any) that remain for completion and/or that are associated with the stops.

According to one aspect of the concepts and technologies disclosed herein, a method is disclosed. The method can include detecting, at a server computer executing a rating service, arrival of a user device at a vendor location. The method also can include detecting, by the server computer, an interaction with a product offered at the vendor location by the user device, determining, by the server computer, that a rating for the product is to be requested, and sending, by the server computer, a request for the rating to the user device.

In some embodiments, the method can include determining that completion of the rating is to be delayed, determining that a delay corresponds to a location-based delay defined by a location constraint, monitoring a location of the user device, detecting satisfaction of the location constraint, and obtaining the rating from the user device. In some embodiments, the method can include determining that completion of the rating is to be delayed, determining that a delay corresponds to a time-based delay defined by a delay time, starting a timer job set to the delay time, detecting expiration of the timer job, and obtaining the rating from the user device. In some embodiments, the location constraint can include leaving a defined geographic location. In some embodiments, the location constraint can include arriving at a defined geographic location.

In some embodiments, the method also can include determining that completion of the rating is to be delayed, determining that a delay corresponds to a request-based delay, detecting a request for the completion of the rating, and obtaining the rating from the user device. Detecting the request can include detecting a request for a shopping route rating display at the user device. Detecting arrival of the user device at the vendor location can include detecting, using a location beacon located at the vendor location, the user device. Detecting arrival of the user device at the vendor location can include receiving location data from the user device, the location data specifying a geographic location corresponding to a further geographic location of the vendor location. Detecting the interaction can include detecting a Web search for the product offered at the vendor location by the user device. In some embodiments, the product includes a service.

According to another aspect of the concepts and technologies disclosed herein, a system is disclosed. The system can include a processor and a memory storing computer-executable instructions. The computer-executable instructions, when executed by the processor, can cause the processor to perform operations including detecting arrival of a user device at a vendor location, detecting an interaction, by the user device, with a product offered at the vendor location by the user device, determining that a rating for the product is to be requested, and sending a request for the rating to the user device.

In some embodiments, execution of the computer-executable instructions by the processor can cause the processor to perform operations further including determining that completion of the rating is to be delayed, determining that a delay corresponds to a location-based delay defined by a location constraint, monitoring a location of the user device, detecting satisfaction of the location constraint, and obtaining the rating from the user device. In some embodiments, execution of the computer-executable instructions by the processor can cause the processor to perform operations further including determining that completion of the rating is to be delayed, determining that a delay corresponds to a time-based delay defined by a delay time, starting a timer job set to the delay time, detecting expiration of the timer job, and obtaining the rating from the user device. In some embodiments, execution of the computer-executable instructions by the processor can cause the processor to perform operations further including determining that completion of the rating is to be delayed, determining that a delay corresponds to a request-based delay, detecting a request for the completion of the rating, and obtaining the rating from the user device. In some embodiments, the system can further include a location beacon at the vendor location and a private network. Detecting arrival of the user device at the vendor location can include receiving, via the private network, data indicating that the user device is detected by the location beacon located at the vendor location.

According to yet another aspect, a computer storage medium is disclosed. The computer storage medium can have computer-executable instructions stored thereon. When the computer-executable instructions are executed by a processor, the processor can perform operations including detecting arrival of a user device at a vendor location, detecting an interaction, by the user device, with a product offered at the vendor location by the user device, determining that a rating for the product is to be requested, and sending a request for the rating to the user device.

In some embodiments, the computer storage medium further includes computer-executable instructions that, when executed by the processor, cause the processor to perform operations including determining that completion of the rating is to be delayed, determining that a delay corresponds to a location-based delay defined by a location constraint, monitoring a location of the user device, detecting satisfaction of the location constraint, and obtaining the rating from the user device. In some embodiments, the computer storage medium further includes computer-executable instructions that, when executed by the processor, cause the processor to perform operations including determining that completion of the rating is to be delayed, determining that a delay corresponds to a time-based delay defined by a delay time, starting a timer job set to the delay time, detecting expiration of the timer job, and obtaining the rating from the user device. In some embodiments, the computer storage medium further includes computer-executable instructions that, when executed by the processor, cause the processor to perform operations including determining that completion of the rating is to be delayed, determining that a delay corresponds to a request-based delay, detecting a request for the completion of the rating, and obtaining the rating from the user device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to obtaining ratings using a rating service. The present disclosure is directed to obtaining ratings using a rating service. A server computer can execute a ratings service that can be used to request ratings from user devices. The ratings requested by the server computer can be requested based upon a location of the user device and information indicating that the user device is interacting with a particular product or service. In some embodiments, the vendors operate location devices such as location beacons at vendor locations and detect presence of the user device at the vendor locations using the location devices. A location of a user device also can be determined by network elements and/or provided by the user device as location information.

As used herein, an "interaction" can include searching the Web for prices, information, and/or reviews associated with the product or service; adding the product or service to a wish list or shopping cart; scanning visual indicia associated with the product or service; accessing a vendor website; combinations thereof; or the like. The requests also can be based upon information provided by a vendor such as, for example, an indication as to if a rating for the product or service is requested. If a rating is to be completed, the ratings can be requested from the user device.

Completion of ratings also can be delayed by users. For example, a user can indicate that a rating is to be delayed until a later time, until a location is arrived at or departed from by the user device, and/or until a user later requests completion of the review. The rating service also can track movement of the user device and present, upon request, a visual display of a travel history associated with, for example, a shopping trip. The visual display can include an indication of stops on the shopping trip, as well as a number of ratings that remain for completion and/or that are associated with the stops.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
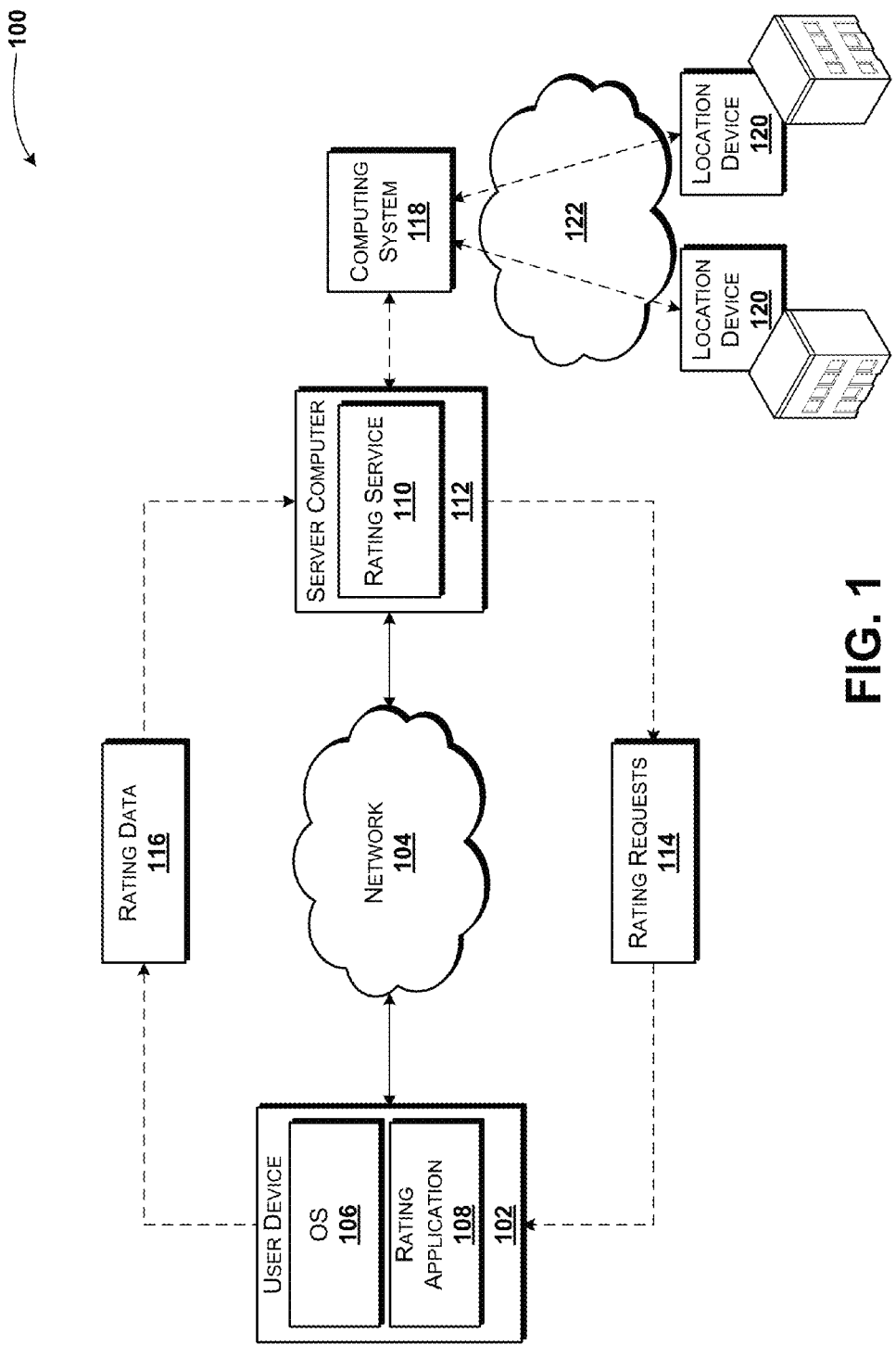
FIG. 1 is a system diagram illustrating an illustrative operating environment for the various embodiments disclosed herein.

Referring now to FIG. 1, aspects of an operating environment 100 for various embodiments of the concepts and technologies disclosed herein for obtaining ratings using a rating service will be described, according to an illustrative embodiment. The operating environment 100 shown in FIG. 1 includes a user device 102 operating in communication with and/or as part of a communications network ("network") 104. According to various embodiments of the concepts and technologies disclosed herein, the functionality of the user device 102 can be provided by a smartphone, a server computer, a desktop computer, a laptop computer, a tablet computer, a netbook computer, a set-top box or embedded computing system, an in-vehicle computing systems, other computing systems, or the like. For purposes of describing the concepts and technologies disclosed herein, the user device 102 is described herein as a smartphone. In light of the above description of other devices that can be configured to provide the functionality described herein with respect to the user device 102, it should be understood that this example is illustrative, and should not be construed as being limiting in any way.

The user device 102 can execute an operating system 106 and one or more application programs such as, for example, a rating application 108. The operating system 106 is a computer program for controlling the operation of the user device 102. The rating application 108 is an executable program configured to execute on top of the operating system 106 to provide the functionality described herein for obtaining ratings using a rating service. The user device 102 also can store and/or execute other application programs, which are not illustrated in FIG. 1.

The rating application 108 can be configured to enable a user to submit ratings. In some embodiments, the rating application 108 can detect a request for a rating and prompt a user to complete the rating. If the user completes the rating, the rating application 108 can communicate the rating to a rating service 110. The rating service 110 can be executed and/or hosted by a computing device such as, for example, a server computer 112.

The rating application 108 also can be configured to monitor activity occurring at the user device 102. In particular, the rating application 108 can be configured to detect when a user is considering purchasing a product or service and inform the rating service 110. The rating service 110 can determine if a vendor associated with the product or service wishes to have a rating completed for the product or service and can sent a request for the rating ("rating request") 114 to the user device 102 in response to determining that a rating is wanted by the vendor. Thus, the rating service 110 can be configured to interact with the rating application 108 to obtain a rating, and can provide data corresponding to the rating ("rating data") 116 to the rating service 110 when a user or other entity associated with the user device 102 is considering a purchase of a product or service.

In some other embodiments, the rating application 108 can be configured to receive the rating request 114 from the rating service 110 without submitting any data to the rating service 110. In particular, the rating service 110 can be configured to communicate with a computing system 118 associated with a vendor. The computing system 118 can correspond, for example, to a server or other computing device. The computing system 118 can communicate with location devices 120 such as BLUETOOTH beacons, radio frequency identification ("RFID") tags, near field communications ("NFC") devices, combinations thereof, or the like. The location devices 120 can communicate with the computing system 118 via a network such as a private network 122 or the like. The location devices 120 can be configured to detect a user or other entity entering a geographic location that corresponds with and/is otherwise associated with the vendor by detecting connection of a device such as the user device 102 with one or more of the location devices 120.

In response to detecting entry of the user device 102 into a location associated with the vendor, the computing system 118 can indicate that the user device 102 is at the location associated with the vendor. The computing system 118 also can indicate a number of products or services sold at the location for which ratings are requested or desired. The rating service 110 can push rating requests 114 for the products, services, or locations to the user device 102. In some embodiments, the rating service 110 pushes the rating requests 114 to the user device 102 if the user device 102 interacts with the product or service for which the ratings are requested.

As used herein, the word "interacting," when used to refer to a product or service can include various activities at the user device 102 that can be interpreted as considering a purchase of the product or service. For example, if a user device 102 conducts a search for a "wireless router," the rating application 108 and/or the rating service 110 can determine that the user of the user device 102 is considering a purchase of a wireless router. Similarly, a price check, bar code scan, other code scan, visit to a website associated with the vendor, or the like, can be interpreted as an interaction with the product or service. It should be understood that these embodiments are illustrative, and should not be construed as being limiting in any way.

Although the rating service 110 is illustrated as a component of the server computer 112, it should be understood that the rating service 110 may be embodied as or in a stand-alone device or component thereof operating as a part of or in communication with the network 104 and/or the user device 102. As such, the illustrated embodiment should be understood as being illustrative of only some contemplated embodiments and should not be construed as being limiting in any way.

The rating application 108 also can be configured to allow a user to delay ratings. In some embodiments, allowing a user to delay completion of ratings can increase a rating completion rate, though this is not necessarily the case. According to various embodiments, the rating application 108 receives a rating request 114 from the rating service 110 or another device or entity. The rating application 108 can cause the user device 102 to prompt a user to complete the rating requested by way of the rating request 114. The rating application 108 also can provide the user with the option to delay completion of the rating.

According to various embodiments, the user can delay completion of the rating according to a time constraint, a location constraint, a manual request to complete the rating, and/or other times or considerations. Thus, for example, a user can specify that he or she is to be reminded later in the day to complete the ratings; until the user leaves or arrives at a particular geographic location to complete the ratings, and/or until the user requests completion of the review at another time. It should be understood that these embodiments are illustrative, and should not be construed as being limiting in any way.

In one embodiment of the concepts and technologies disclosed herein, the rating application 108 and/or the rating service 110 can be configured to generate a display showing reviews that can be completed by a user. In one example shown in FIG. 4C, the display can include a map display showing a shopping route completed by the user and available reviews associated with each stop of the shopping route. It should be understood that this embodiment is illustrative, and should not be construed as being limiting in any way. These and other aspects of the concepts and technologies disclosed herein for obtaining ratings using a rating service will be illustrated and described in more detail below.

FIG. 1 illustrates one user device 102, one network 104, one server computer 112, one computing system 118, two location devices 120, and one private network 122. It should be understood, however, that various implementations of the operating environment 100 include multiple user devices 102, multiple networks 104, multiple server computers 112, multiple computing systems 118, less than two, two, or more than two location devices 120, and/or multiple private networks 122. As such, the illustrated embodiment should be understood as being illustrative, and should not be construed as being limiting in any way.

Figure 2:
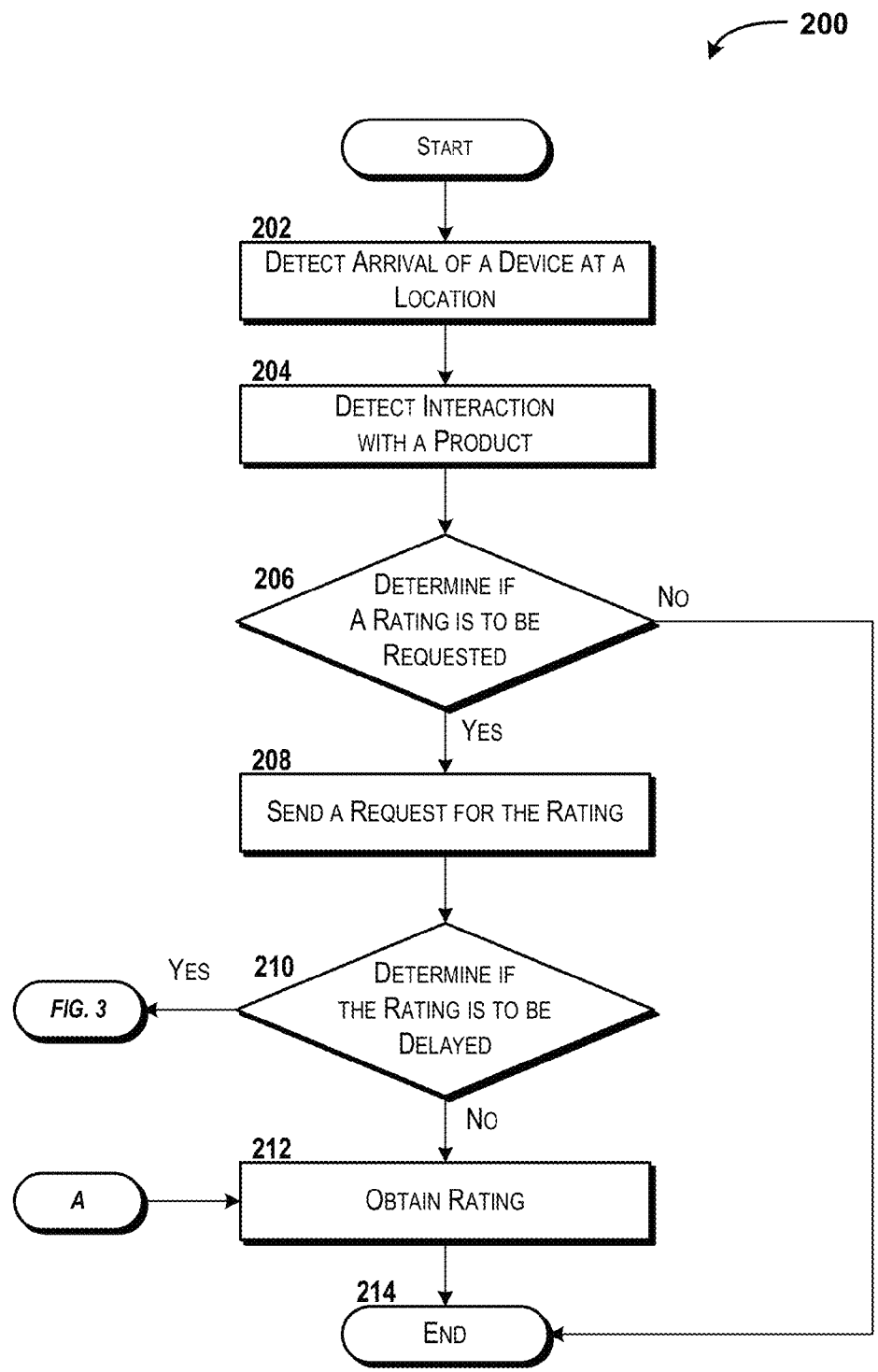
FIG. 2 is a flow diagram showing aspects of a method for requesting a rating using a rating service, according to an illustrative embodiment.

Turning now to FIG. 2, aspects of a method 200 for requesting a rating using a rating service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 112, to perform one or more operations and/or causing the processor to direct other components of the computing system or device to perform one or more of the operations.

For purposes of illustrating and describing the concepts of the present disclosure, the methods disclosed herein are described as being performed by the server computer 112 via execution of one or more software modules such as, for example, the rating service 110. It should be understood that additional and/or alternative devices and/or network nodes can provide the functionality described herein via execution of one or more modules, applications, and/or other software including, but not limited to, the rating service 110. Thus, the illustrated embodiments are illustrative, and should not be viewed as being limiting in any way.

The method 200 begins at operation 202, wherein the server computer 112 detects arrival of a device at a location. As explained above, the server computer 112 can detect that a device such as the user device 102 has arrived at a particular geographic location based upon data received from the user device 102, data received from the computing system 118, other information, combinations thereof, or the like. As noted above, the computing system 118 can collect data from the location devices 120 and can determine, based upon the collected data, that the user device 102 has arrived at a location associated with a vendor store, office, or other location. Because the server computer 112 can determine that the user device 102 has arrived at a location in additional and/or alternative ways, it should be understood that these embodiments are illustrative, and should not be construed as being limiting in any way.

From operation 202, the method 200 proceeds to operation 204, wherein the server computer 112 detects an interaction with a product. As noted above, the product interacted with can include a product or a service, and the interaction with the product or service can be detected by detecting a barcode scan, a QR-code or other code scan, a Web search or query, an access to a website associated with a vendor of the product or service, combinations thereof, or the like. Because the interaction can be detected by the server computer 112 in additional and/or alternative ways, it should be understood that these examples are illustrative, and should not be construed as being limiting in any way.

From operation 204, the method 200 proceeds to operation 206, wherein the server computer 112 determines if a rating for the product interacted with at the device is to be requested. In some embodiments, the server computer 112 can maintain a database or list of products or services for which a vendor has requested ratings. Thus, the server computer 112 can determine, in operation 206, if the product or service interacted with at the user device 102 is included in the list or database.

In some other embodiments, the server computer 112 can receive, from a service or product vendor, a list of products or services (or even locations) for which ratings are requested. This and other information can be provided to the server computer 112, for example, in response to detecting (at the computing system 118) that the user device 102 has entered a location associated with the vendor. Thus, the server computer 112 can be configured to determine, based upon data obtained from the user device 102, the computing system 118, data stored at a database, and/or other data, if a rating for the product or service or location is requested.

If the server computer 112 determines that the rating for the product is to be requested, the method 200 proceeds to operation 208. In operation 208, the server computer 112 sends a request for the rating. In some embodiments, the request can correspond to the rating request 114 described above with reference to FIG. 1, and the rating request 114 can be provided to the user device 102. Although only one request 114 is illustrated as being sent in operation 208, it should be understood that the server computer 112 can send multiple requests to a recipient in operation 208. For example, the computing system 118 can request ratings for multiple products in response to detecting the interaction (e.g., multiple related products, the product and a location, the product and a service, combinations thereof, or the like). Thus, the server computer 112 can send multiple requests 114 to the device 102 in operation 208, if desired.

From operation 208, the method 200 proceeds to operation 210, wherein the server computer 112 determines if the rating is to be delayed. As explained herein, the rating service 110 and/or the rating application 108 executed by the user device 102 can be configured to delay completion of one or more ratings for various reasons. Thus, a user may delay a rating to a time at which the user can focus on the rating, for example. An example method for delaying completion of the rating is illustrated and described below with reference to FIG. 3, and some example user interfaces for allowing a user to delay completion of the review are illustrated and described below with reference to FIGS. 4A-4B.

If the server computer 112 determines, in operation 210, that the rating is to be delayed, the server computer 112 can pause execution of the method 200 and execute the method 300 illustrated and described below with reference to FIG. 3. If the server computer 112 determines, in operation 210, that the rating is not to be delayed, the method 200 proceeds to operation 212. In operation 212, the server computer 112 can obtain the rating from the user. An example user interface via which the rating can be obtained is illustrated and described below with reference to FIG. 4D. It should be understood that operation 210 can include the server computer 112 receiving ratings data 116, which can be submitted in response to completion of the rating. Because the server computer 112 can obtain the rating in additional and/or alternative ways, it should be understood that this example is illustrative.

From operation 210, the method 200 proceeds to operation 212. The method 200 also can proceed to operation 214 from operation 206 if the server computer 112 determines, in operation 206, that the rating for the product is not to be requested. The method 200 ends at operation 212. Although not shown in FIG. 2, it also should be understood that a user can elect not to complete a rating (even with a delay). As such, the method 200 can be terminated at operation 208 or 210, if the server computer 112 receives an indication that the user has opted out of the rating.

Figure 3:
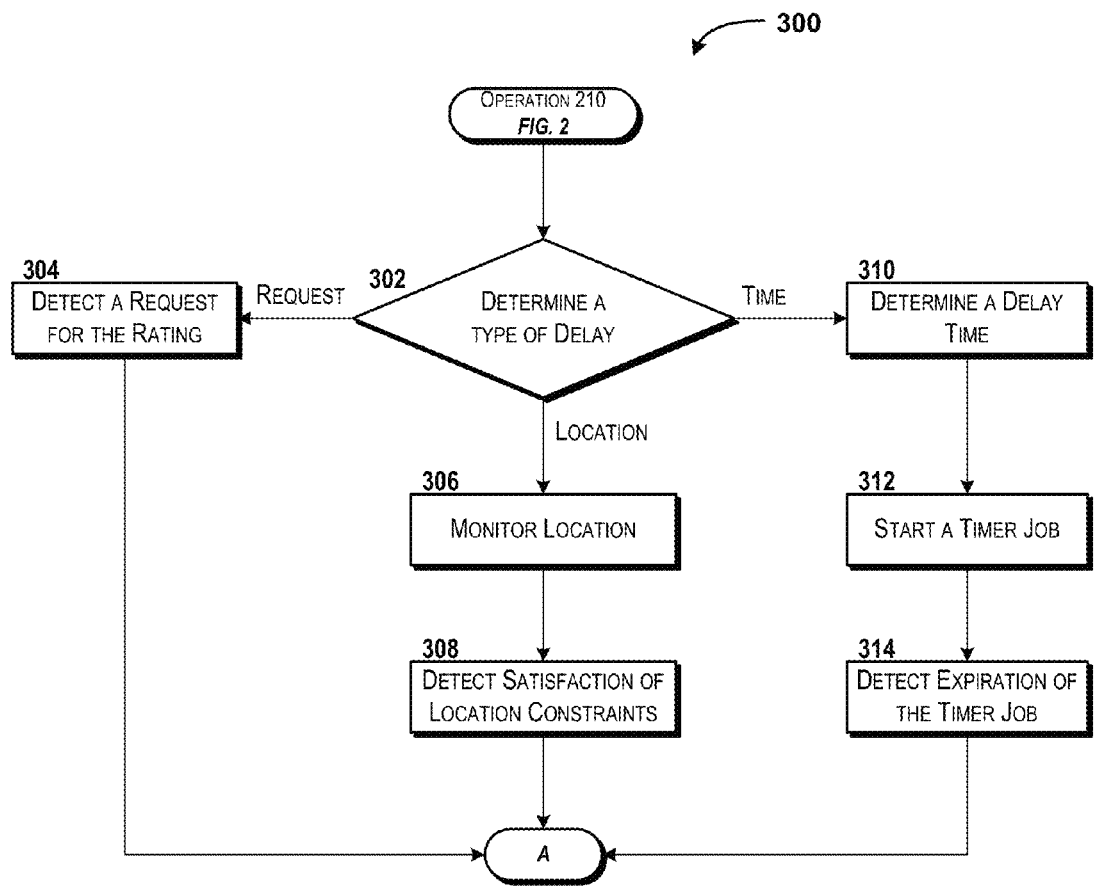
FIG. 3 is a flow diagram showing aspects of a method for delaying a rating using a rating service, according to another illustrative embodiment.

Turning now to FIG. 3, aspects of a method 300 for delaying a rating using a rating service will be described in detail, according to an illustrative embodiment. It should be understood that the method 300 described herein can be executed by the server computer 112 at operation 210, if the server computer 112 determines that the rating is to be delayed.

The method 300 begins at operation 302, wherein the server computer 112 determines a type of delay. As explained above, the rating application 108 and/or the rating service 110 can support user selection of various types of delays including, but not limited to, a time-based delay, a location-based delay, a delay until the user requests completion of the rating, other delays, or the like. Thus, the server computer 112 can determine, in operation 302, if the delay detected in operation 210 corresponds to a request-based delay, a location-based delay, and/or a time-based delay, among other types of delays.

If the server computer 112 determines that the user device 102 has elected to generate a request when ready for the rating, the method 300 can proceed to operation 304. At operation 304, the server computer 112 can detect a request for the rating from the user device 102. Although not shown in FIG. 3, it should be understood that execution of the method 300 can pause at operation 304 until the server computer 112 detects the request for the rating as shown at operation 304.

If the server computer 112 determines, in operation 302, that the user device 102 has elected to delay the rating based on location information, the method 300 can proceed to operation 306. At operation 306, the server computer 112 can begin monitoring a location of the user device 102. The server computer 112 can be configured to monitor the location of the user device 102 to determine when the user device 102 arrives at a specified location and/or when the device 102 leaves a specified location.

From operation 306, the method 300 proceeds to operation 308, wherein the server computer 112 detects satisfaction of a location constraint. As mentioned above, the location constraint can correspond, in some embodiments, to arrival at a location or departure from a location. As such, the server computer 112 can determine, in operation 308, that the user device 102 has arrived at the specified location or departed from the specified location.

The location constraints also can include additional considerations such as, for example, determining that the user device 102 has been at a specified location for a specified amount of time, that the user device 102 has been away from the specified location for a specified amount of time, combinations thereof, or the like. Because other location-based constraints are contemplated and are possible, the above examples should be understood as being illustrative and should not be construed as being limiting in any way. Although not shown in FIG. 3, it should be understood that execution of the method 300 can pause at operation 308 until the server computer 112 detects that the location constraints have been satisfied. Furthermore, it should be understood that the server computer 112 can be configured to maintain and monitor a "geofence" by executing operations 306-308.

If the server computer 112 determines, in operation 302, that the user device 102 has elected to delay the rating based on a time constraint, the method 300 can proceed to operation 310. At operation 310, the server computer 112 can determine a delay time. The delay time can be specified when delaying of the rating is requested, by preferences or device settings, and/or by one or more settings or preferences associated with the rating service 110. Thus, operation 310 can include the server computer 112 accessing preferences, settings, or the like to determine a delay time.

From operation 310, the method 300 proceeds to operation 312, wherein the server computer 112 starts a timer job corresponding to the determined delay time. Thus, for example, if a user or other entity specifies a particular time at which the rating is to be completed, the server computer 112 can compute a time between a current time and the specified time and start a timer job that will expire at the particular time specified. If the user or other entity specifies a particular delay time, the server computer 112 can start a timer job corresponding to the specified time.

From operation 312, the method 300 proceeds to operation 314, wherein the server computer 112 detects expiration of the timer job started in operation 312. Although not shown in FIG. 3, it should be understood that execution of the method 300 can pause at operation 312 until the server computer 112 detects that the timer job started in operation 312 has expired.

From operation 314, the method 300 proceeds to block A. The method 300 also can proceed to block A from operations 308 or 304. At block A, the method 300 can terminate and execution of the method 200 can resume at operation 212.

Although not shown in FIG. 3, it should be understood that the server computer 112 can take various actions in addition to, or instead of, returning execution to operation 212 as described above For example, the server computer 112 can be configured to generate a prompt for the user device 102 to determine if the user device 102 is ready to complete the rating. As such, the illustrated embodiment of FIG. 3, wherein the server computer 112 returns to execution of the method 200 at operation 212 is illustrative and should not be construed as being limiting in any way.

Figure 4A:
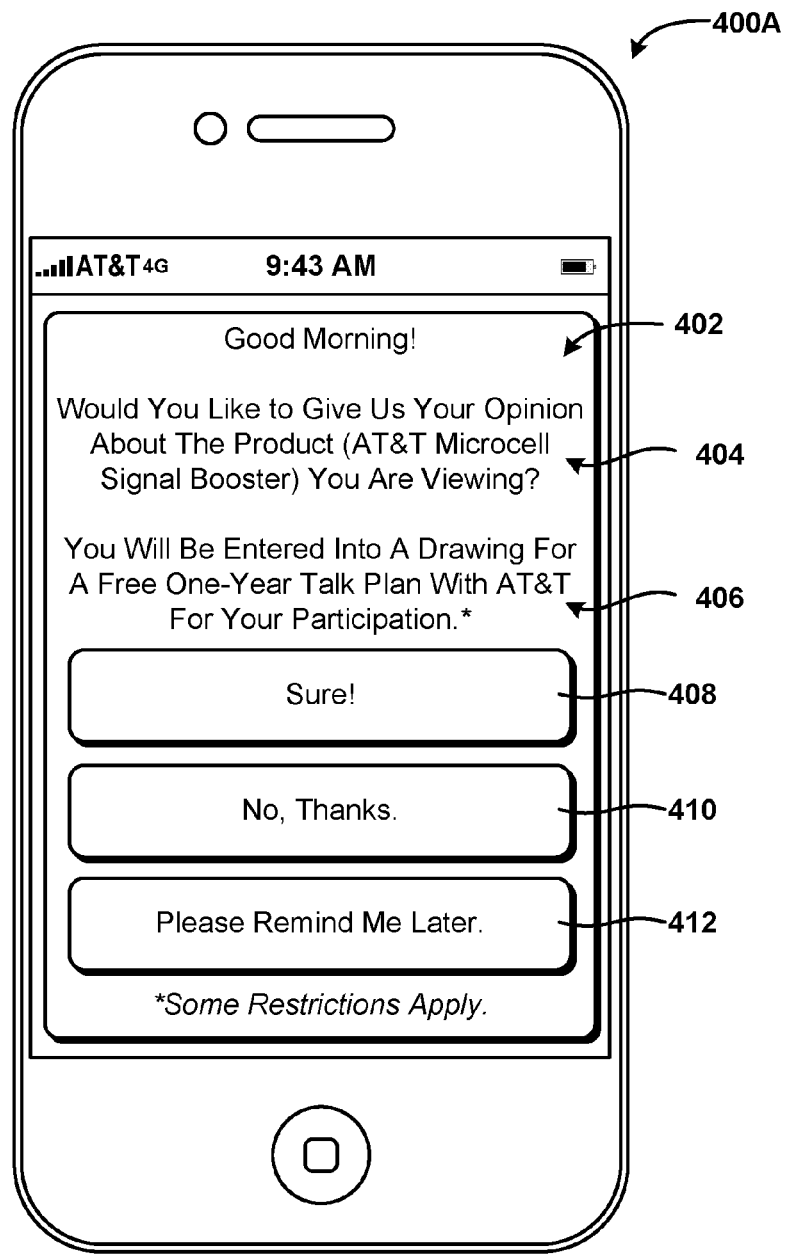
FIGS. 4A-4D are user interface ("UI") diagrams showing aspects of UIs for obtaining ratings using a rating service, according to some illustrative embodiments.

FIGS. 4A-4D are user interface ("UI") diagrams showing aspects of UIs for obtaining ratings using a rating service, according to some illustrative embodiments. FIG. 4A shows an illustrative screen display 400A generated by a device such as the user device 102. According to various embodiments, the user device 102 can generate the screen display 400A and/or other screen displays in conjunction with and/or based upon data received from the rating service 110 described herein. It should be appreciated that the UI diagram illustrated in FIG. 4A is illustrative of one contemplated example of the UIs that can be generated and/or displayed in accordance with the concepts and technologies disclosed herein, and therefore should not be construed as being limited in any way.

Although not shown in FIG. 4A, the screen display 400A can include various menus and/or menu options. The screen display 400A also can include a rating request display 402. The rating request display 402 can be used to push rating requests, such as the rating requests 114 shown in FIG. 1, to the user device 102. It can be appreciated that the screen display 400A can be presented, for example, in response to receiving a request generated by the rating service 110 as explained above with reference to operation 208 of the method 200 illustrated in FIG. 2. It should be understood that this embodiment is illustrative, and should not be construed as being limiting in any way.

The rating request display 402 can explain that a rating is requested. Additionally, the rating request display 402 can include an indication 404 of an item or product for which the rating is requested. In some embodiments, the rating request display 402 can also include an incentive 406 for the user completing the rating, though this is not necessarily the case. Instead of merely providing a "yes" or "no" response from the user, the rating request display 402 can include a UI control 408 for agreeing to conduct the rating, a UI control 410 for not agreeing to conduct the rating, and a UI control 412 for delaying the rating to a later time. As explained herein, the rating can be delayed to the later time based upon time constraints, location constraints, a manual delay, and/or other considerations.

It can be appreciated from the above description of the methods 200, 300 that selection of the UI controls 408 and 412 can cause the user device 102 to provide input to the server computer 112. Receipt of this input by the server computer 112 can correspond to operation 210 illustrated in FIG. 2, though this is not necessarily the case. Although not shown in FIG. 2, selection of the UI control 410 can cause the user device 102 to transmit data to the server computer 112 that can terminate the execution of the method 200. It should be understood that these embodiments are illustrative, and should not be construed as being limiting in any way.

Figure 4B:
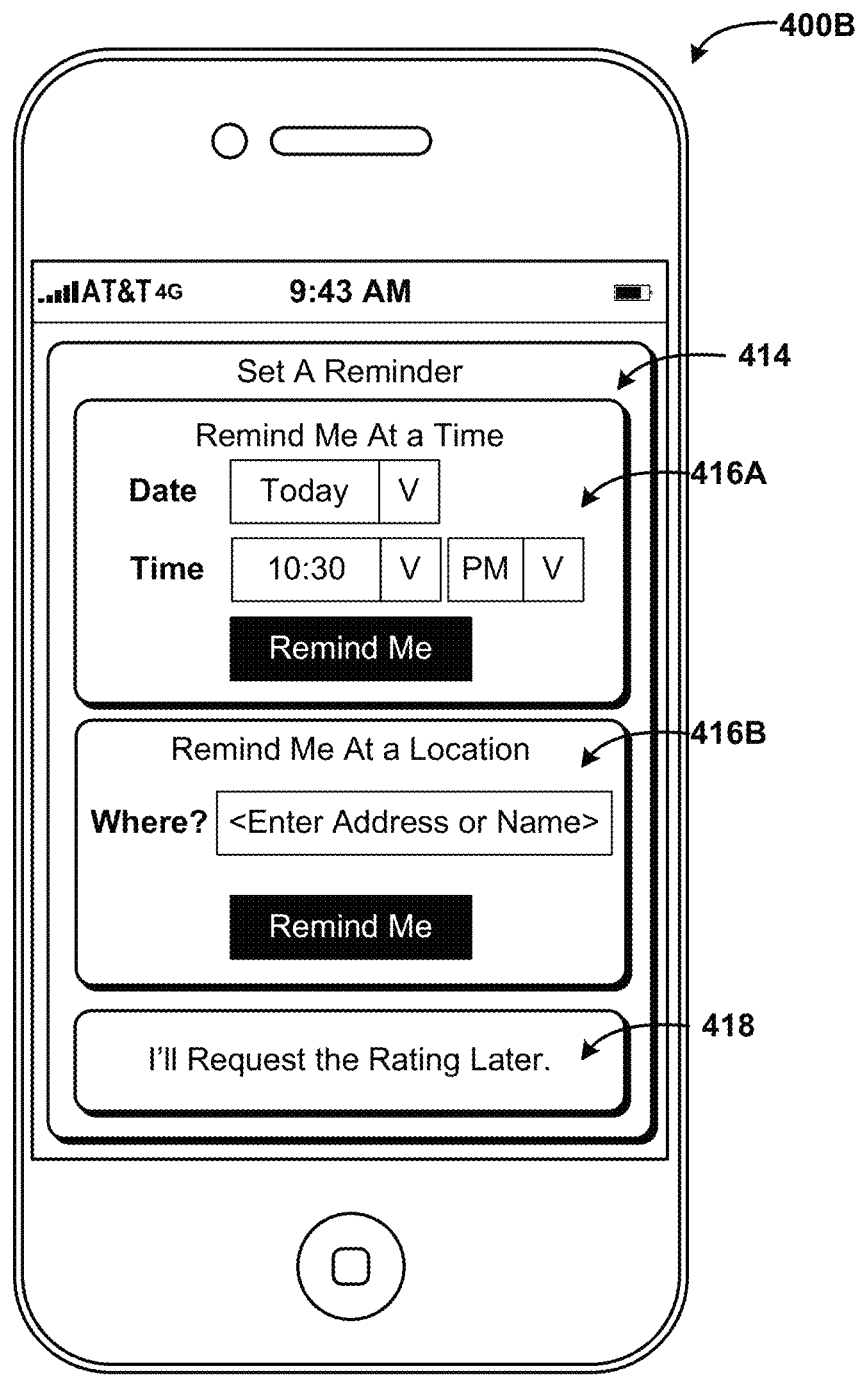

Referring now to FIG. 4B, a UI diagram showing additional aspects of the concepts and technologies disclosed herein for obtaining ratings using a rating service are described in detail. In particular, FIG. 4B shows an illustrative screen display 400B generated by a device such as the user device 102. It should be appreciated that the UI diagram illustrated in FIG. 4B is illustrative of one contemplated example of the UIs that can be generated and/or displayed in accordance with the concepts and technologies disclosed herein, and therefore should not be construed as being limited in any way.

The screen display 400B can include a reminder configuration screen 414. The reminder configuration screen 414 can be used to allow users or other entities to configure a reminder to complete a rating. It should be understood that the screen display 400B can be, but is not necessarily, generated by the user device 102 in response to detecting selection of the UI control 412 described above with reference to FIG. 4A. Because the reminder configuration screen 414 can be displayed at additional and/or alternative times, it should be understood that this embodiment is illustrative, and should not be construed as being limiting in any way.

As shown in FIG. 4B, the reminder configuration screen 414 includes two reminder configuration fields 416A-B (hereinafter collectively and/or generically referred to as "reminder configuration fields 416"). The reminder configuration fields can include various fields and/or UI controls for configuring a reminder and accepting the configured reminder. The reminder configuration field 416A can be used by a user to configure a time-based reminder as disclosed herein. Although FIG. 4B illustrates the time-based reminder as being generated at a particular time, it should be understood that the time-based reminder can include a specified delay such as, for example, five minutes, ten minutes, one hour, one day, or the like. The reminder configuration field 416B can be used by a user to configure a location-based reminder as disclosed herein. Although FIG. 4B illustrates the location-based reminder as being generated when the user arrives at a particular location, it should be understood that the location-based reminder can be generated when a user leaves a particular location.

The reminder configuration screen 414 also includes a UI control 418 for manually completing the rating at a later time. Selection of the UI control 418 can cause the user device 102 to inform the rating service 110 that the rating will be completed at a later time without a reminder. Because additional and/or alternative reminder configuration fields 416 and UI controls can be included in the screen display 400B, and because selection of the UI controls can cause the user device 102 to take additional and/or alternative actions, it should be understood that these embodiments are illustrative, and should not be construed as being limiting in any way.

Figure 4C:
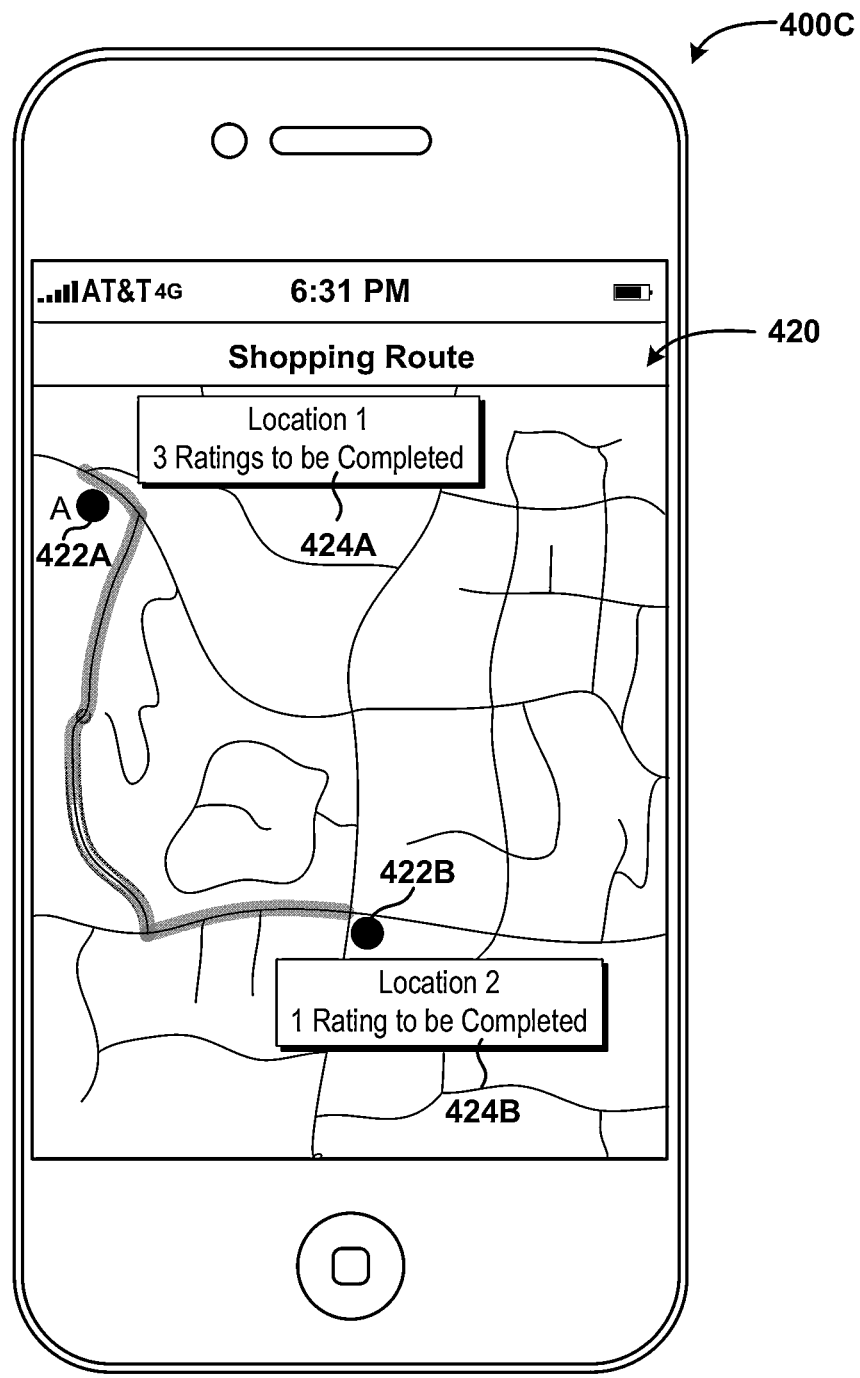

Referring now to FIG. 4C, a UI diagram showing additional aspects of the concepts and technologies disclosed herein for obtaining ratings using a rating service are described in detail. In particular, FIG. 4C shows an illustrative screen display 400C generated by a device such as the user device 102. It should be appreciated that the UI diagram illustrated in FIG. 4C is illustrative of one contemplated example of the UIs that can be generated and/or displayed in accordance with the concepts and technologies disclosed herein, and therefore should not be construed as being limited in any way.

The screen display 400C can include a shopping route rating display 420. The shopping route rating display 420 can be used to allow users to view a shopping route or trip and associated ratings that are available for completion by the user. Thus, the shopping route rating display 420 can be used to remind a user to complete ratings, for example ratings that the user indicated he or she would like to be reminded to complete. Thus, the shopping route rating display 420 can be used to quickly determine a number of ratings and what products are to be rated.

As shown in FIG. 4C, the shopping route rating display 420 includes a map display with two location indicators 424A-B (hereinafter collectively and/or generically referred to as "location indicators 424"). The location indicators 424 can show a location on the map corresponding to a shopping stop made by the user or another entity during some previous time frame, for example, a current or previous day. Because the shopping route rating display 420 can include less than two location indicators 424, two location indicators 424, and/or more than two location indicators 424, the illustrated example should be understood as being illustrative and should not be construed as being limiting in any way.

The shopping route rating display 420 also includes two rating indicators 422A-B (hereinafter collectively and/or generically referred to as "rating indicators 422"). The rating indicators 422 can provide a user or other entity with an indication of a location, a number of ratings available that are associated with that location, and/or other information (not illustrated in FIG. 4C). The rating indicators 422 can also function as UI controls that, when selected, cause the user device 102 to present one or more ratings indicated by the rating indicators 422. Because the shopping route rating display 420 can include less than two rating indicators 422, two rating indicators 422, and/or more than two rating indicators 422, the illustrated example should be understood as being illustrative and should not be construed as being limiting in any way.

Figure 4D:
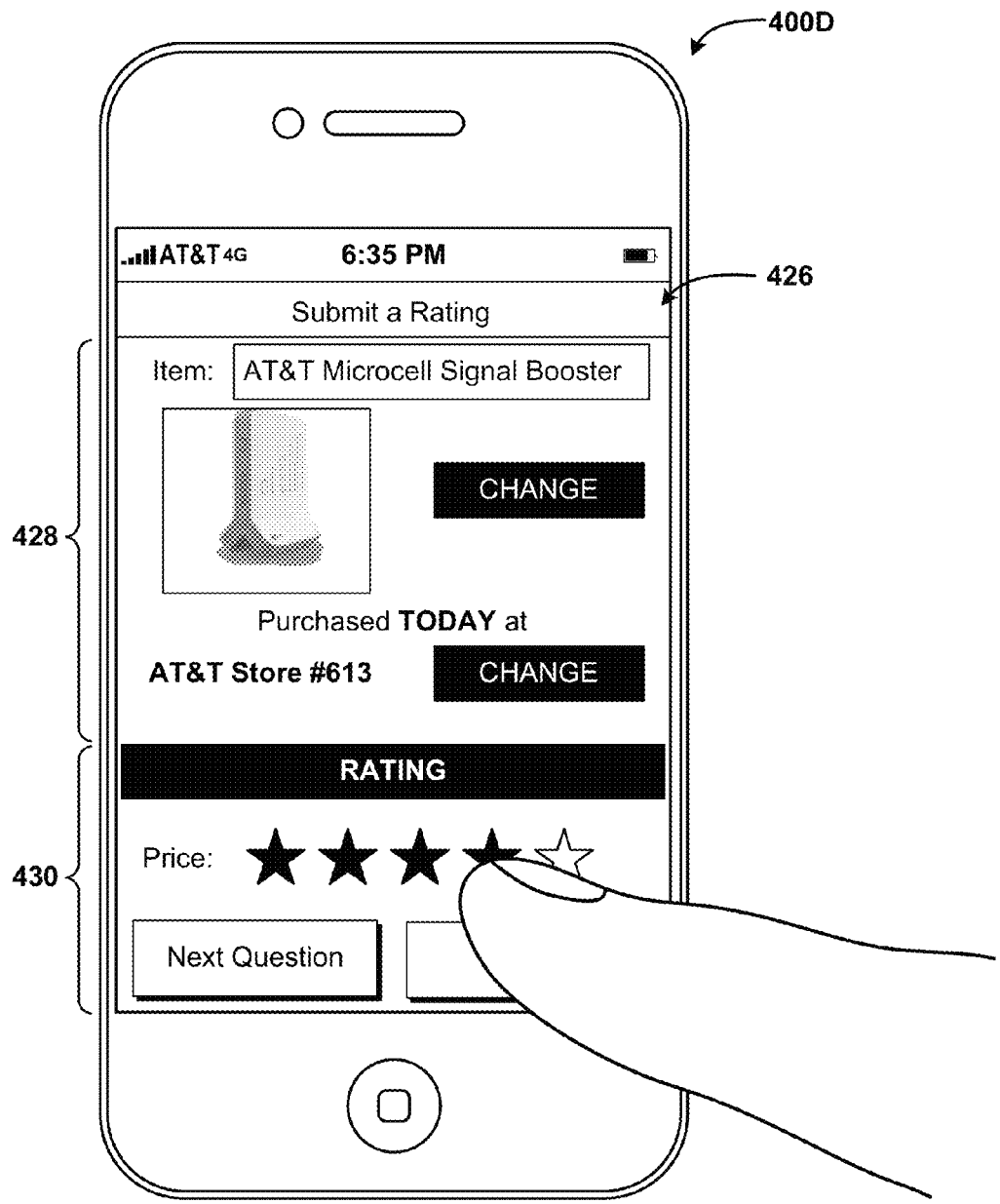

Referring now to FIG. 4D, a UI diagram showing additional aspects of the concepts and technologies disclosed herein for obtaining ratings using a rating service are described in detail. In particular, FIG. 4D shows an illustrative screen display 400D generated by a device such as the user device 102. It should be appreciated that the UI diagram illustrated in FIG. 4D is illustrative of one contemplated example of the UIs that can be generated and/or displayed in accordance with the concepts and technologies disclosed herein, and therefore should not be construed as being limited in any way.

The screen display 400D can include a rating submission screen 426. The rating submission screen 426 can be used to allow users to complete a rating. It can be appreciated that the rating submission screen 426 can be presented in response to a user selecting the UI control 408 shown in FIG. 4A and/or one of the rating indicators 422 shown in FIG. 4C. Because the rating submission screen 426 can be displayed at additional and/or alternative times, it should be understood that this embodiment is illustrative, and should not be construed as being limiting in any way.

The rating submission screen 426 can include a rating description area 428 for indicating various details about the product or service being rated. The rating description area 428 can include a photograph of the product or an image associated with the service, a description of the product or service (for example a name of the product or service), purchase information that indicates where and/or when the product or service was purchased (or considered, if the product or service was not purchased), and one or more UI controls for changing a product or service description, a location and/or time of the purchase, combinations thereof, or the like. Because the rating description area 428 can include additional and/or alternative information and UI controls, it should be understood that this embodiment is illustrative, and should not be construed as being limiting in any way.

The rating submission screen 426 also can include a rating area 430 for indicating a rating associated with the product or service indicated in the rating description area 428. In some embodiments, the rating area 430 can include multiple questions and/or pages that can be swiped or automatically cycled through, a single question, multiple questions that can extend past a visible area of the display and therefore can be scrolled to, or the like. Thus, a user can interact with the screen display 400D to submit a rating to a rating service 110 or other entity. Because additional and/or alternative information can be included in the rating area 430, it should be understood that the illustrated example is illustrative and should not be construed as being limiting in any way.

Figure 5:
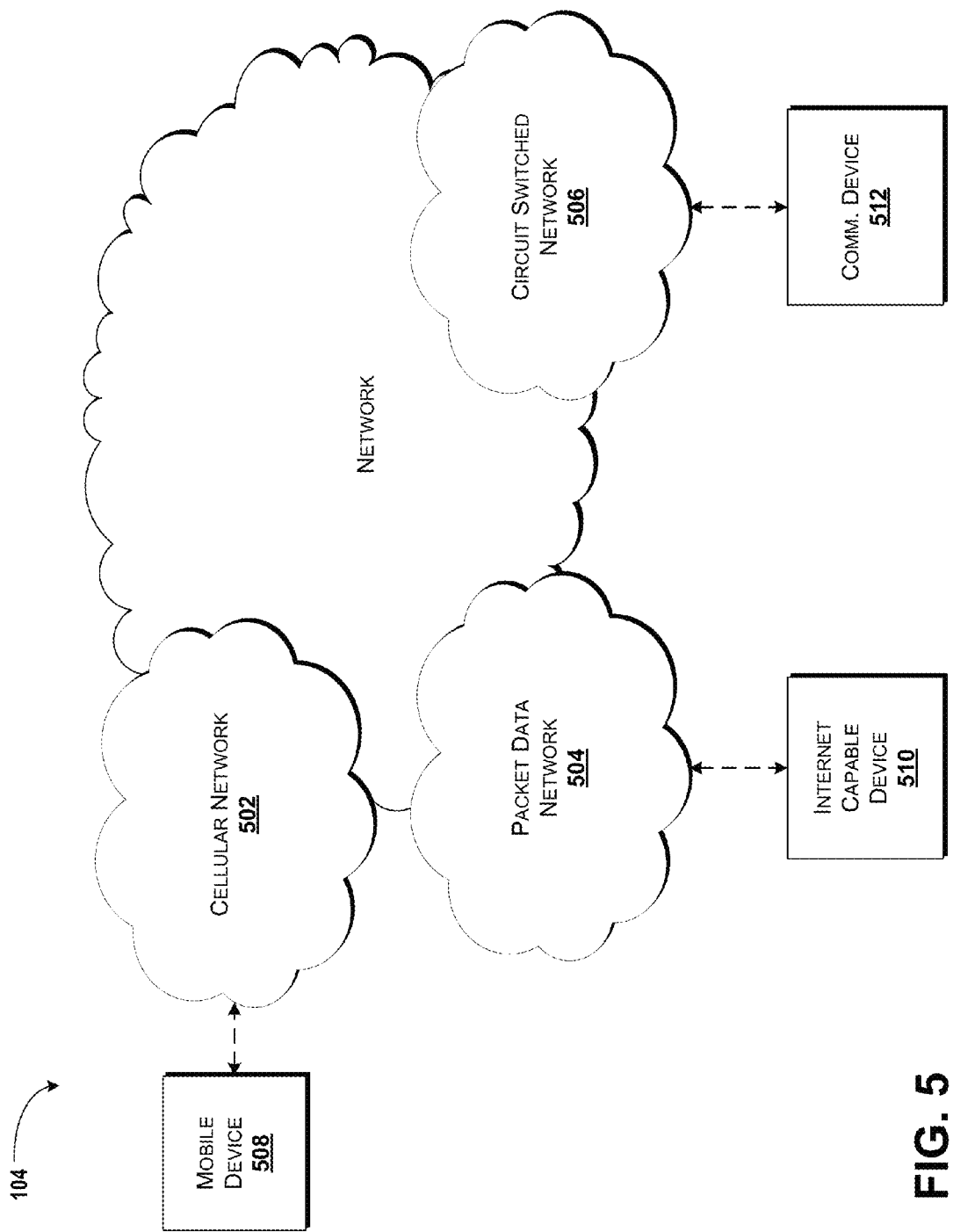
FIG. 5 schematically illustrates a network, according to an illustrative embodiment.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
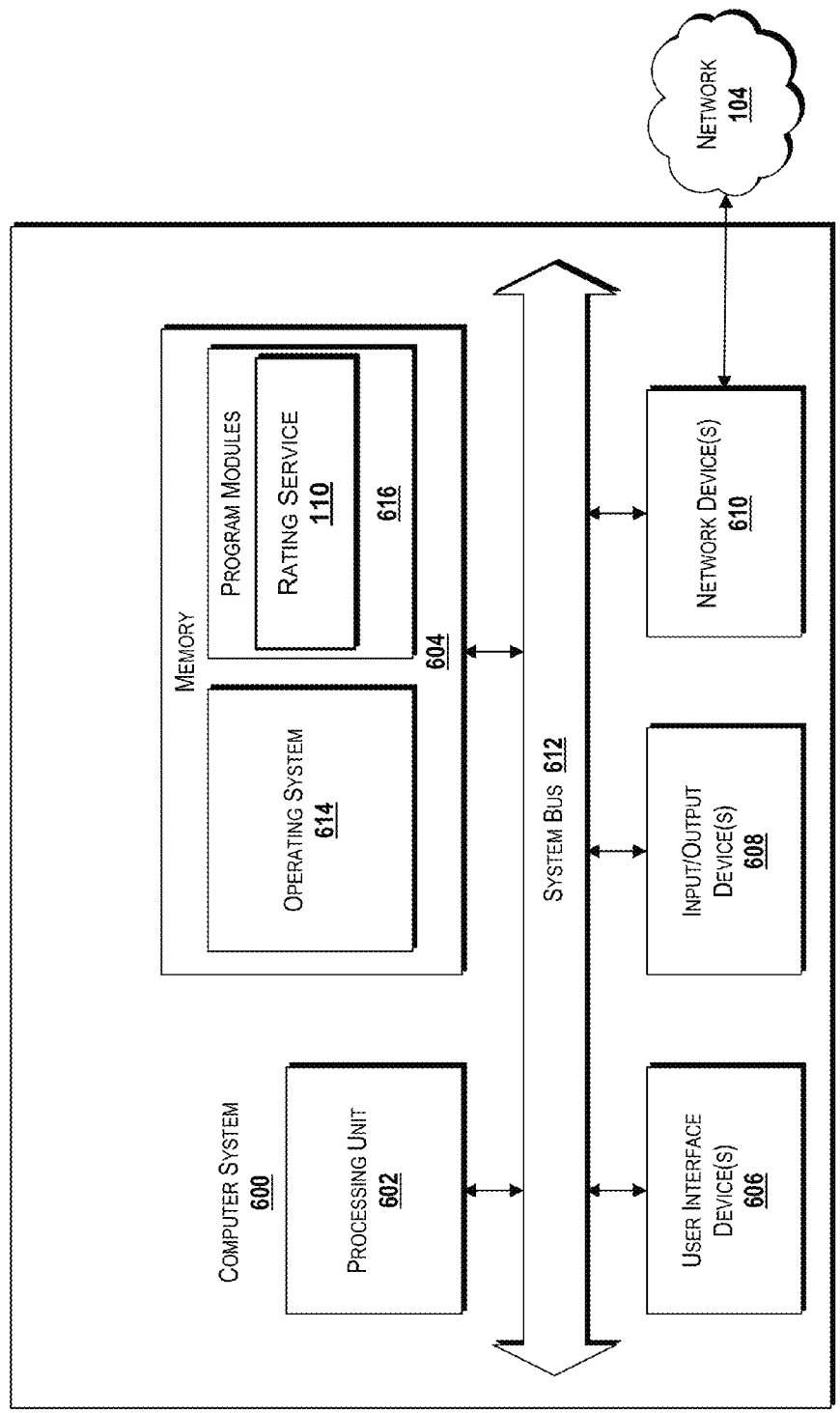
FIG. 6 is a block diagram illustrating an example computer system configured to obtain ratings using a rating service, according to some illustrative embodiments.

FIG. 6 is a block diagram illustrating a computer system 600 configured to provide the functionality described herein for obtaining ratings using a rating service, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the rating service 110. This and/or other programs can be embodied in computer-readable media containing instructions that, when executed by the processing unit 602, perform one or more of the methods 200, 300 described in detail above with respect to FIGS. 2-3. According to embodiments, the program modules 616 may be embodied in hardware, software, firmware, or any combination thereof. Although not shown in FIG. 6, it should be understood that the memory 604 also can be configured to store the rating data 116 and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
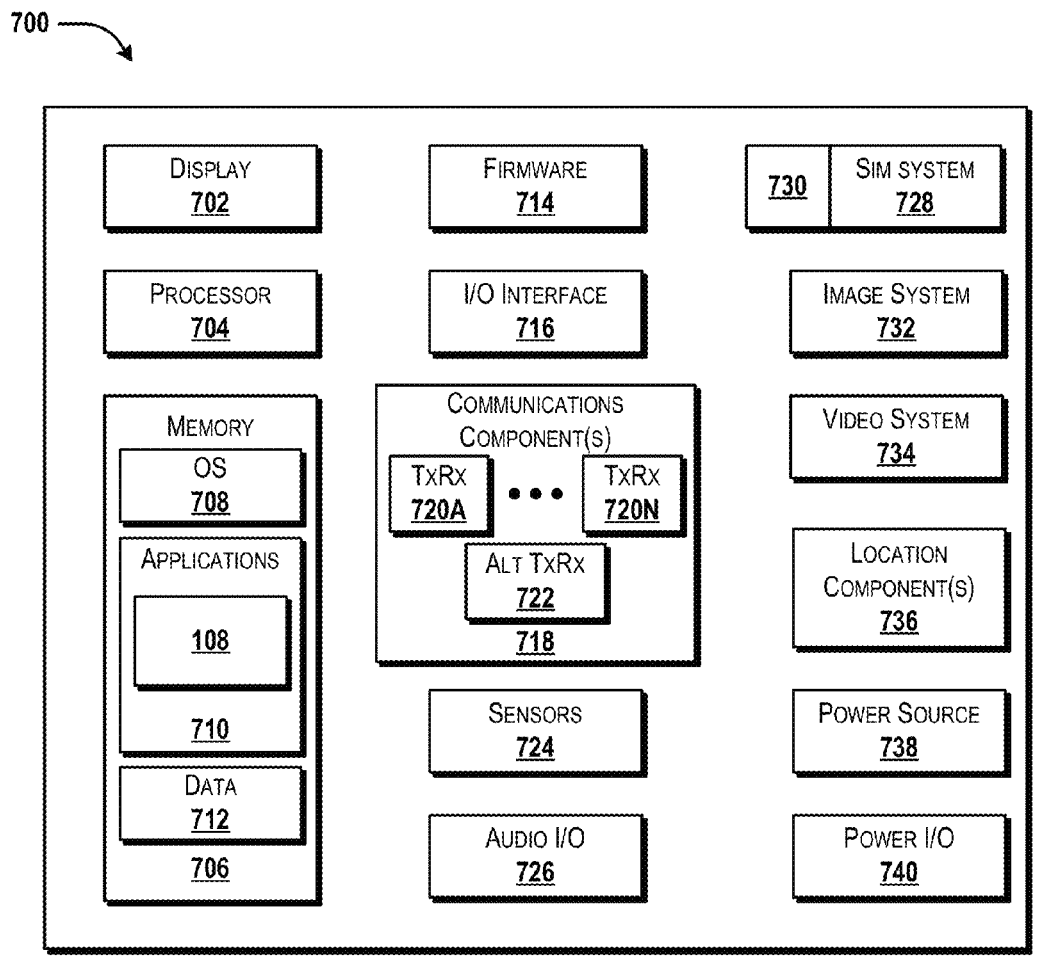
FIG. 7 is a block diagram illustrating an example mobile device configured to interact with a rating service, according to some illustrative embodiments.

Turning now to FIG. 7, an illustrative mobile device 700 and components thereof will be described. In some embodiments, the user device 102 described above with reference to FIGS. 1-6 can be configured as and/or can have an architecture similar or identical to the mobile device 700 described herein in FIG. 7. It should be understood, however, that the user device 102 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display asset information, asset tag or asset ID information, asset management account information, various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the rating application 108, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, scanning or capturing asset ID or asset tag information, creating new asset tags or asset ID numbers, viewing asset information and/or account information, answering/initiating calls, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, asset information, asset tags and/or asset identifiers, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, asset information, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the networks 104, 122 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for obtaining ratings using a rating service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   detecting, at a server computer executing a rating service, arrival of a user device at a vendor location;
   detecting, by the server computer, an interaction by the user device with a product offered at the vendor location;
   in response to determining, by the server computer, that a rating for the product should be requested from the user device, determining that requesting of the rating should be delayed based on a location-based delay defined by a location constraint;
   monitoring, by the server computer, a location of the user device using a positioning system signal; and
   in response to determining that the location of the user device satisfies the location constraint, requesting, by the server computer, the rating from the user device.

2. The method of claim 1, further comprising: determining that requesting of the rating should be delayed by a delay time;
   starting a timer job set to the delay time; and
   detecting expiration of the timer job.

3. The method of claim 1, wherein the location constraint comprises one of leaving a defined geographic location or arriving at the defined geographic location.

4. The method of claim 1, further comprising:
   determining that requesting of the rating should be delayed until requested; and
   detecting a request for the rating.

5. The method of claim 4, wherein detecting the request comprises detecting a request for a shopping route rating display at the user device, wherein the shopping route rating display comprises a map display and a plurality of location indicators, and wherein each location indicator of the plurality of location indicators indicates that a rating should be completed for a shopping stop that corresponds to the location indicator.

6. The method of claim 1, wherein detecting arrival of the user device at the vendor location comprises detecting, using a location beacon located at the vendor location, the user device.

7. The method of claim 1, wherein detecting arrival of the user device at the vendor location comprises receiving location data from the user device, the location data specifying a geographic location corresponding to a further geographic location of the vendor location.

8. The method of claim 1, wherein detecting the interaction comprises detecting a Web search for the product offered at the vendor location by the user device.

9. The method of claim 8, wherein the product comprises a service.

10. A system comprising:
    a processor; and
    a memory storing computer-executable instructions that, when executed by the processor, cause the processor to perform operations comprising
      detecting arrival of a user device at a vendor location,
      detecting an interaction, by the user device, with a product offered at the vendor location,
      in response to determining that a rating for the product should be requested from the user device, determining that requesting of the rating should be delayed based on a location-based delay defined by a location constraint,
      monitoring a location of the user device using a positioning system signal, and
      in response to determining that the location of the user device satisfies the location constraint, requesting the rating from the user device.

11. The system of claim 10, wherein execution of the computer-executable instructions by the processor causes the processor to perform operations further comprising:
    determining that requesting of the rating should be delayed by a delay time;
    starting a timer job set to the delay time; and
    detecting expiration of the timer job.

12. The system of claim 10, wherein execution of the computer-executable instructions by the processor causes the processor to perform operations further comprising:
    determining that requesting of the rating should be delayed until requested; and
    detecting a request for the rating.

13. The system of claim 10, further comprising:
    a location beacon at the vendor location; and
    a private network, wherein detecting arrival of the user device at the vendor location comprises receiving, via the private network, data indicating that the user device is detected by the location beacon located at the vendor location.

14. A computer storage medium having computer-executable instructions stored thereon that, when executed by a processor, cause the processor to perform operations comprising:
    detecting arrival of a user device at a vendor location;
    detecting an interaction, by the user device, with a product offered at the vendor location;
    in response to determining that a rating for the product should be requested from the user device, determining that requesting of the rating should be delayed based on a location-based delay defined by a location constraint;
    monitoring a location of the user device using a positioning system signal; and
    in response to determining that the location of the user device satisfies the location constraint, requesting the rating from the user device.

15. The computer storage medium of claim 14, further comprising computer-executable instructions that, when executed by the processor, cause the processor to perform operations comprising:
    determining that requesting of the rating should be delayed by a delay time;
    starting a timer job set to the delay time; and
    detecting expiration of the timer job.

16. The computer storage medium of claim 14, further comprising computer-executable instructions that, when executed by the processor, cause the processor to perform operations comprising:

determining that requesting of the rating should be delayed until requested; and detecting a request for the rating.

17. The method of claim 1, wherein determining that the rating for the product should be requested from the user device comprises:

receiving a list of products for which ratings are requested; and determining that the list of products includes the product.

18. The method of claim 1, wherein the positioning system signal comprises a global positioning signal.

19. The method of claim 1, wherein the positioning system signal comprises a WiFi signal.

20. The method of claim 1, wherein the positioning system signal comprises a cellular network signal.

* * * * *